United States Patent Office 3,529,151
Patented Sept. 15, 1970

3,529,151
METHOD OF AND APPARATUS FOR DETERMINING THE MEAN SIZE OF GIVEN PARTICLES IN A FLUID
Kenneth Garfield Carr-Brion, Stevenage, England, assignor to National Research Development Corporation, London, England
Filed Mar. 20, 1967, Ser. No. 624,461
Claims priority, application Great Britain, Mar. 28, 1966, 13,598
Int. Cl. G01n 23/12
U.S. Cl. 250—43.5
12 Claims

ABSTRACT OF THE DISCLOSURE

A method of and apparatus for determining the mean size of given solid particles in a fluid in which two respective penetrating radiations such as X-rays having different respective mean energies. These energies are so chosen that the respective radiation intensities after transmission through the fluid are respectively independent of and dependent on the mean particle size in the fluid, so that comparison of these intensities provides an indication of the mean particle size.

---

This invention relates to a method of and apparatus for determining the mean size of given solid particles in a fluid.

The invention utilises the absorption of penetrating electromagnetic radiation passing through a fluid to determine the mean size of given solid particles therein. By the term "penetrating electromagnetic radiation" as used herein, it is intended to include both X-radiation and gamma-radiation.

In general the absorption suffered by a beam of penetrating electromagnetic radiation passing through a homogeneous material may be expressed as the ratio of the intensity of the transmitted radiation, $I_t$, to the intensity of the incident radiation, $I_0$, as follows:

$$I_t/I_0 = e^{-\mu \rho x}$$

where $\mu$ is the mass coefficient of absorption of material for the radiation in question;
$\rho$ is the density of the material, and
$x$ is the distance traversed by the beam in the material. If the beam is not parallel, a suitably corrected equivalent distance is substituted for $x$.

When penetrating radiation such as X-radiation is passed through heterogeneous material, such as fluid containing solid particles in suspension, the intensity of the transmitted radiation $I_t$ is also a function of the path traversed through each particle, assuming that the particles contain a given solid component which absorbs the radiation. In this case, the transmitted intensity $I_t$ will be a function of the mean particle size. Such dependence on the mean particle size is observable only for a certain range of particle sizes, and is dependent on the mean energy of the penetrating radiation and the composition of the particles in respect of the given absorbing component.

In order to provide an indication of the mean size of given solid particles of an absorbing component in a fluid, it is necessary to distinguish the absorption effect due to the particle size and the effect due to the concentration of the absorbing component in the fluid, both these effects being, of course, present together. According to the present invention, this is achieved by measuring the transmitted intensity of two separate beams of penetrating radiation having different mean energies, so chosen that one beam shows a marked "particle size effect," that is, suffers absorption in dependence on the mean particle size, and the other of which shows a negligible such effect.

According, therefore, to the present invention in one aspect thereof, there is provided a method of determining the mean size of given solid particles in a fluid comprising passing through the fluid two respective penetrating electromagnetic radiations having two different respective mean energies such that the respective intensities of said radiations after transmission through the fluid are respectively independent of and dependent on the mean size of the particles in the fluid, and comparing said respective intensities to provide an indication of said mean particle size.

According to one preferred method of carrying out the invention, the fluid is passed through two chambers in succession and the two respective penetrating radiations are emitted by two respective sources and pass through different said chambers before their respective intensities are measured by two respective detectors. The respective thicknesses of the said two chambers are preferably so arranged that the two respective radiations suffer substantially the same absorption by the fluid in passing through the respective chambers when no particles are present in the fluid.

The respective penetrating radiations may comprise respective secondary X-rays emitted by respective targets on irradiation from a common primary source or two respective primary sources of exciting radiation of sufficient energy to excite said secondary X-rays.

In an alternative method according to the invention, the said respective radiations are derived by passing radiation from a common source through respective filters prior to or after passing through the fluid. The fluid may be passed through a chamber through which the respective radiations are passed, the respective said intensities of the radiations after transmission through the respective samples in the chamber being measured successively by a common detector. Alternatively, the respective intensities of the radiations after transmission through the fluid may be measured simultaneously by means of an energy dependent detector, the respective detected intensities being separated electronically.

The penetrating radiation whose intensity after transmission through the fluid is dependent on the mean size of the particles therein may be so chosen that the mean energy thereof just exceeds that of an absorption edge of an element present predominantly in the given particles. Alternately, the said radiation may be such that its mean energy is substantially less than that of a said absorption edge.

Calibration graphs can be prepared showing the relation between the respective said intensities for different mean sizes of the given particles in the fluid.

The invention also includes apparatus for determining the mean size of given solid particles in a fluid by the method set forth above, said apparatus comprising means for passing through the fluid two respective penetrating electromagnetic radiations having two different respective mean energies such that the respective intensities of said radiations after transmission through the fluid are respectively independent of and dependent on the mean size of the particles in the fluid, and means for comparing said respective intensities to provide an indication of said mean particle size.

The invention will be described, merely by way of example, with reference to the accompanying drawings, in which.

Figure 2:
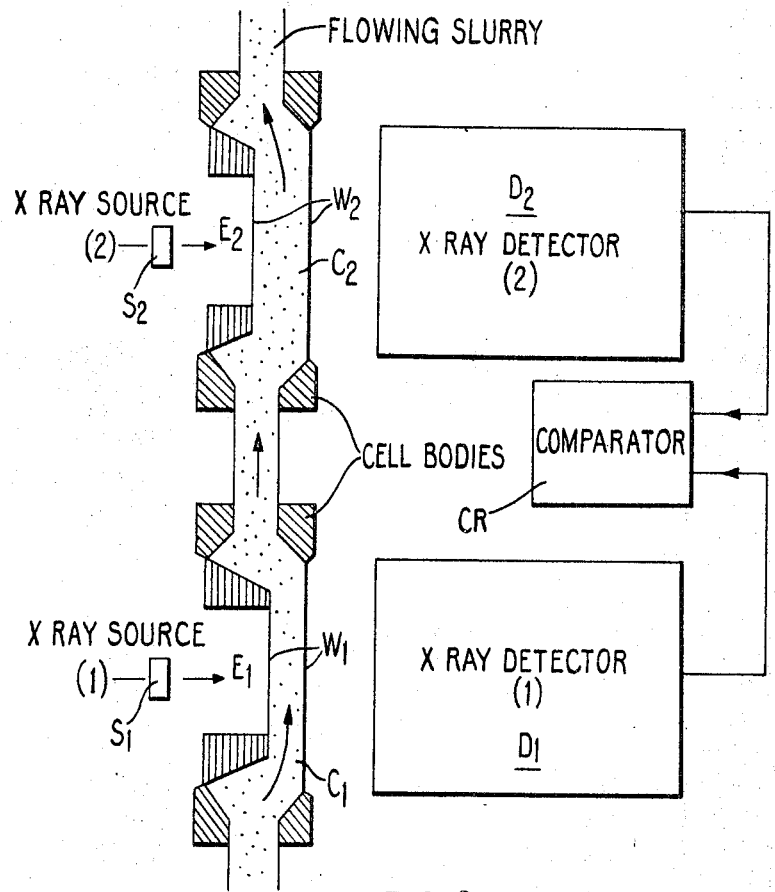

Referring first to FIG. 2, there is shown, purely diagrammatically, a form of apparatus according to the invention employing two separate X-ray beams of different respective mean energies $E_1$, $E_2$. The respective beams are emited by respective sources $S_1$, $S_2$ which comprise respective X-ray tubes or radio-isotope sources. Alternatively, the sources $S_1$, $S_2$ may be secondary sources, that is, they may comprise respective targets irradiated by X- or gamma-radiation from respective "primary" sources, or from a common primary source. In this case, the or each primary source may comprise an X-ray tube or a radio-isotope. The respective energies $E_1$, $E_2$ of the secondary X-rays emitted by the respective sources $S_1$, $S_2$ are in this case determined by selection of the respective elements comprising the respective targets.

It is desired to find the mean size of particles of a given absorbing component in a fluid under test, for example, a liquid slurry. The slurry is passed through two chambers $C_1$, $C_2$ in succession in the direction indicated by the arrows. Each chamber $C_1$, $C_2$ is provided with respective pairs of parallel X-ray windows $W_1$, $W_2$ which are disposed perpendicularly to the direction of the respective X-ray beams from the sources $S_1$, $S_2$. The windows $W_1$, $W_2$ may be made of any convenient known material transparent to the X-rays being used, a suitable material being that sold under the Trade Mark "Melinex."

The chambers $C_1$, $C_2$ are disposed between the respective sources $S_1$, $S_2$ and respective X-ray detectors $D_1$, $D_2$. The detectors $D_1$, $D_2$ may be of any convenient type and may, for example, comprise respective scintillation counters associated with electronic pulse counting equipment. At any given instant, the absorption suffered by the respective X-rays from the sources $S_1$, $S_2$ in passing through the respective chambers $C_1$, $C_2$ is measured by the respective detectors $D_1$, $D_2$.

The respective energies $E_1$, $E_2$ of the X-rays from the respective sources $S_1$, $S_2$ are so chosen that the X-rays of energy $E_1$ show a marked particle size effect, as described above, in respect of the given component of the particles in the fluid while the X-rays of energy $E_2$ show a negligible particle size effect in respect of this component. A comparison of the two intensities $I_1$, $I_2$ detected by the respective detectors $D_1$, $D_2$ is then made in a comparator CR to provide an indication of the mean particle size of the said solid component.

The separations of the respective pairs of windows $W_1$, $W_2$, that is, the effective thickness of the samples of fluid through which the two respective X-rays pass, may be, for maximum performance of the apparatus, different, and may be so chosen that the absorptions of the respective X-rays in passing through the respective chambers $C_1$, $C_2$ in the absence of any patricles of the said absorbing component are equal.

Figure 1:
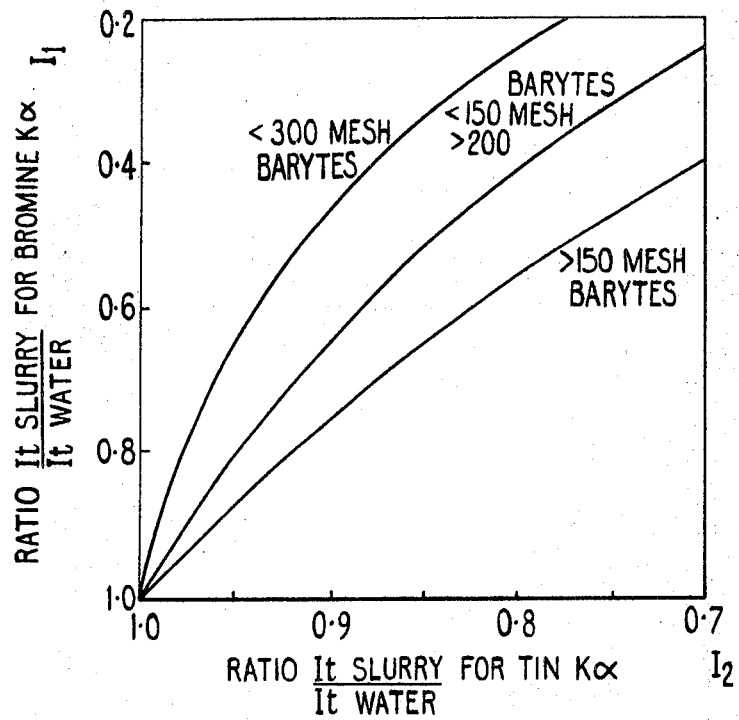
FIG. 1 illustrates calibration graphs obtained by the method of the present invention.

One method of calibrating the apparatus is illustrated in FIG. 1. The respective intensities $I_1$, $I_2$ detected by the respective detectors $D_1$, $D_2$ are plotted on respective co-ordinate axes for different particle densities in the slurry, different graphs being ploted for different mean sizes of the given component. FIG. 1 illustrates the calibration of apparatus such as that shown in FIG. 3 for determining the mean size of barytes particles contained together with quartz particles as a slurry in water. The respective X-rays employed were respectively the bromine $K_\alpha$ and tin $K_\alpha$ radiations, derived from secondary sources $S_1$, $S_2$, containing bromine and tin respectively, these radiations having respective energies $E_1$, $E_2$ such that they display a substantial particle size effect and negligible particle size effect respectively in respect of the barytes particles. The two X-rays were only weakly absorbed by the quartz particles.

Three calibration curves are ilustrated, each showing the effect of variations in the concentration of the absorbing component (barytes) for barytes particles of three different mesh sizes.

If a series of curves such as those of FIG. 1 were plotted for various mean particle sizes of the absorbing component, the mean particle size corresponding to a curve obtained with a slurry containing said particles of unknown size could be deduced by interpolation.

The results obtained were substantially unaffected by variations in the concentrations in the slurry of non-absorbing particle components, in this case quartz. Thus variations in the concentration of the quartz particles in the solid component of the slurry between 0 and 20 percent were found to cause negligible error in determination of the barytes mean particle size.

Figure 3:
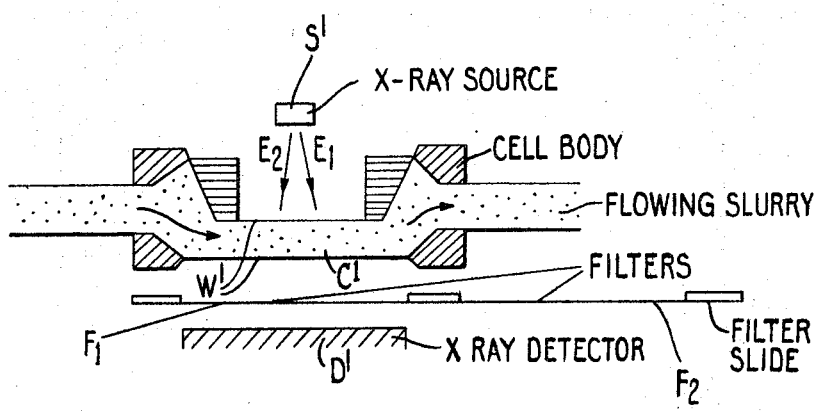
FIGS. 2 and 3 illustrate diagrammatically respective alternative embodiments of apparatus for carrying out the invention.

FIG. 3 illustrates an alternative form of apparatus according to the invention employing a single X-ray source $S'$ and a single chamber $C'$ formed between parallel windows $W'$. The intensity of X-rays after passing through the chamber $C'$ in a direction substantially normal to the window $W'$ is measured by a single detector $D'$.

In order to distinguish between the absorptions suffered by X-rays of the two respective energies $E_1$, $E_2$, two respective filters $F_1$, $F_2$ are disposed successively between the chamber $C'$ and the detector $D'$. The filter $F_1$ is so chosen that it has an absorption edge or discontinuity just above the energy $E_1$, and the filter $F_2$ an absorption edge or discontinuity just below the energy $E_1$. The two filters are preferably "balanced," that is, their relative thicknesses are such that the transmission curves of the two filters coincide except between their K absorption discontinuities. A method of so balancing filters is described, for example, by P. A. Ross in the Journal of the Optical Society of America and Review of Scientific Instruments (1928), vol. 16, p. 433.

Sequential measurements are made of the respective intensities $I_1$, $I_2$ of the X-rays detected after transmission through the respective filters $F_1$, $F_2$; the intensities $I_1$, $I_2$ will clearly be equivalent to the respective intensities detected by the respective detectors $D_1$, $D_2$ of the apparatus of FIG. 2. One of the intensities, $I_2$, is plotted against the net difference between the intensities $I_1$, $I_2$.

While the two intensities $I_1$, $I_2$ measured by the detectors $D_1$, $D_2$ in the apparatus of FIG. 2 are measured simultaneously, however, the intensities $I_1$, $I_2$ in the apparatus of FIG. 3 are measured in the single detector $D'$ sequentially. The apparatus of FIG. 3 is, therefore, susceptible to inaccuracies due to changes in pressure occurring between the successive measurements through the respective filters $F_1$, $F_2$ and causing distortion of the windows $W'$, leading to consequent changes in the effective thickness of the chamber $C'$ between the two measurements. Changes in concentration of the absorbing component in the slurry between the two successive measurements will also lead to inaccuracies in the resultant estimation of the size of the particle component.

Figure 4:
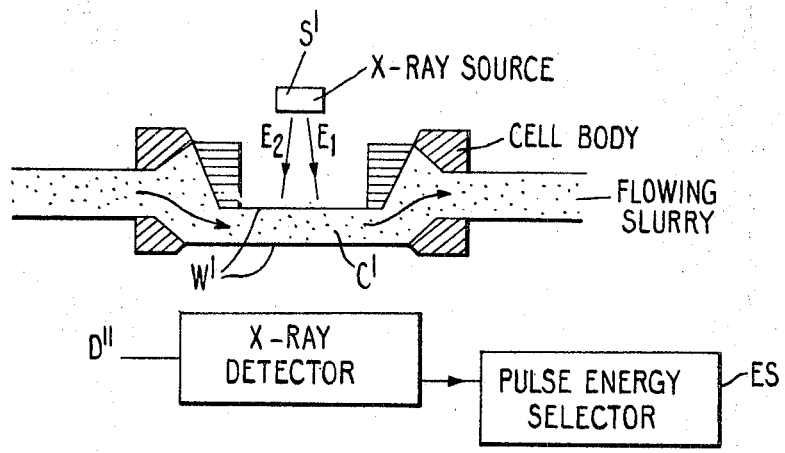
FIG. 4 illustrates diagrammatically a modification of the embodiment of FIG. 3.

These inaccuracies are avoided by making simultaneous measurements, using the apparatus shown in FIG. 4, which is a modification of the apparatus of FIG. 3. In FIG. 4 the filters $F_1$, $F_2$ are dispensed with and an energy dependent detector $D''$ is employed in place of the detector $D'$; the respective intensities of the radiations after transmission through the sample in the chamber $C'$ at energies $E_1$, $E_2$ are measured simultaneously by the detector $D''$. These respective intensities are then separated electronically by two-channel pulse energy selector ES the channels of which are responsive to radiation of energy $E_1$, $E_2$ respectively.

The X-rays used in the two methods described above are normally approximately monochromatic, but may in certain cases be polychromatic. The respective energies or mean energies $E_1$, $E_2$ are selected to cover the particle size range which it is desired to measure. Since the mass absorption coefficient $\mu$ of the fluid varies with the composition of the X-ray absorbing phases present, the apparatus according to the invention (FIGS. 2, 3 and 4) can only be used where the composition of the solid particles can be controlled within limits which do not cause the transmitted intensity of the X-rays to vary significantly. In certain cases the X-ray energies $E_1$, $E_2$ can also be selected to reduce their dependence on variations in the composition of the absorbing phase.

Increased dependence of the measured intensities $I_1$, $I_2$ on the particle size of a given absorbing particle component can be achieved by so selecting the energy of the X-rays which suffer a marked particle size effect that this energy just exceeds that of an absorption edge of an element present in major amounts only in that particle component.

I claim:

1. A method of determining the mean size of given solid particles in a fluid comprising passing through the fluid two respective X-ray or two respective gamma ray radiations having two different predetermined respective mean energies such that the respective intensities of said radiations after transmission through the fluid are respectively independent of and dependent on the mean size of the particles in the fluid, and comparing said respective intensities to provide an indication of said particle size.

2. A method as claimed in claim 1 in which the fluid is passed through two chambers in succession and the two respective radiations are directed through different said chambers before their respective intensities are measured.

3. A method as claimed in claim 2 in which the relative thicknesses of the said two chambers are so arranged that the two respective radiations suffer substantially the same absorption by the fluid in passing through the respective chambers when no particles are present in the fluid.

4. A method as claimed in claim 1 in which the radiation whose intensity after transmission through the fluid is dependent on the mean size of the particles therein is so chosen that the mean energy thereof just exceeds that of an absorption edge of an element present predominantly in the given particles.

5. A method as claimed in claim 2 in which calibration graphs are prepared showing the relation between the respective said intensities for different mean sizes of the given particles in the fluid.

6. Apparatus for determining the mean size of given solid particles in a fluid comprising means emitting respective X-ray or respective gamma ray radiations, means for passing the respective radiations through the fluid, said radiations having two different respective mean energies such that the respective intensities of said radiations after transmission through the fluid are respectively independent of and dependent on the mean size of the particles in the fluid, and detector means for comparing said respective intensities to provide an indication of said mean particle size.

7. Apparatus as claimed in claim 6 in which radiation emitting means comprise two respective radio-active sources.

8. Apparatus as claimed in claim 6 in which the radiation emitting means comprise at least one primary source of exciting radiation and respective targets which emit secondary X-rays on irradiation from the primary source, said secondary X-rays comprising the respective penetrating electromagnetic radiations.

9. Apparatus as claimed in claim 6 in which the said radiation emitting means comprise a common source and respective filters which transmit only radiation of said respective mean energies, said filters being disposed between the source and the detector means.

10. Apparatus as claimed in claim 9 including a chamber through which the fluid and the respective radiations are passed, said detector means comprising a common detector for measuring the respective said intensities of the radiations after transmission through the fluid in the chamber.

11. Apparatus as claimed in claim 6 in which the detector means comprises an energy dependent detector for measuring simultaneously rhteespective intensities of the radiations after transmission through the fluid and means for separating electronically the respective intensities detected by said detector.

12. A method of determining the mean size of given solid particles in a fluid comprising passing through the fluid two respective X-ray or two respective gamma ray radiations having two different predetermined respective mean energies such that the respective intensities of said radiations after transmission through the fluid are respectively independent of and dependent on the mean size of the particles in the fluid, comparing said respective intensities to provide an indication of said particle size, passing the fluid through two chambers in succession, and directing the two respective radiations through different said chambers before their respective intensities are measured.

References Cited

UNITED STATES PATENTS

| 3,334,231 | 8/1967 | Bernstein | 250—83.3 |
| 3,255,975 | 6/1966 | Malin et al. | 250—43.5 X |
| 3,210,541 | 10/1965 | Cropper et al. | 250—43.5 |
| 3,038,076 | 6/1962 | Scherbatskoy | 250—83.6 X |
| 3,315,076 | 4/1967 | Jordan | 250—83.3 |

RALPH G. NILSON, Primary Examiner

D. L. WILLIS, Assistant Examiner

U.S. Cl. X.R.

250—83.6